United States Patent
Kessinger

(10) Patent No.: US 9,501,048 B2
(45) Date of Patent: Nov. 22, 2016

(54) SYSTEM AND METHOD FOR CUSTOMIZED, ON-DEMAND PRODUCTION OF MINTED METAL AND MINTED METAL ASSEMBLIES

(71) Applicant: Roger A. Kessinger, Whitefish, MT (US)

(72) Inventor: Roger A. Kessinger, Whitefish, MT (US)

( * ) Notice: Subject to any disclaimer, the term of this patent is extended or adjusted under 35 U.S.C. 154(b) by 637 days.

(21) Appl. No.: 13/895,610

(22) Filed: May 16, 2013

(65) Prior Publication Data
US 2014/0343705 A1    Nov. 20, 2014

(51) Int. Cl.
G05B 15/02      (2006.01)
B44B 5/00       (2006.01)
B44B 3/00       (2006.01)
G05B 19/4097    (2006.01)

(52) U.S. Cl.
CPC ............... *G05B 15/02* (2013.01); *B44B 3/00* (2013.01); *B44B 5/0095* (2013.01); *G05B 19/4097* (2013.01)

(58) Field of Classification Search
CPC ...... G05B 15/02; G05B 19/4097; B44B 3/00
See application file for complete search history.

(56) References Cited

U.S. PATENT DOCUMENTS

| | | |
|---|---|---|
| 2,998,126 A | 8/1961 | Jenkins |
| 3,480,500 A | 11/1969 | Hotter |
| 4,503,110 A | 3/1985 | Skene |
| 4,592,465 A | 6/1986 | Stein |
| 4,883,554 A | 11/1989 | Bida |
| 5,033,774 A | 7/1991 | Benardelli |
| 5,034,081 A | 7/1991 | Aizawa et al. |
| 5,120,589 A | 6/1992 | Morikawa et al. |
| 5,270,101 A | 12/1993 | Helicher |
| 5,364,482 A | 11/1994 | Morikawa et al. |
| 5,569,003 A | 10/1996 | Goldman et al. |
| 5,626,937 A | 5/1997 | Morikawa et al. |
| 5,703,782 A | 12/1997 | Dundorf |
| 6,128,840 A | 10/2000 | Boisvert |
| 6,668,210 B1 | 12/2003 | Kim et al. |
| 6,845,585 B2 | 1/2005 | Callander et al. |
| D569,575 S | 5/2008 | Yalinkaya |
| D571,075 S | 6/2008 | Yalinkaya |
| 7,413,128 B2 | 8/2008 | Waldo et al. |
| 7,563,340 B2 * | 7/2009 | Peterson ............... B44B 5/00 156/263 |
| 8,393,266 B2 | 3/2013 | Rasmussen et al. |

(Continued)

FOREIGN PATENT DOCUMENTS

WO   WO2014001774 A1   1/2014
WO   WO2014186496      11/2014

OTHER PUBLICATIONS

Medallic catelog 2012 (Medallic.com, 2012, http://www.medallic.com/catalogue/academic2012/academic2012.pdf, 9 pages).*

(Continued)

*Primary Examiner* — Christopher E Everett
(74) *Attorney, Agent, or Firm* — Hanrahan Law Firm, P.A.; Benjamin M. Hanrahan

(57) ABSTRACT

A computer-based system and method for the customized, on-demand production of minted metal pieces or minted metal assemblies is presented herein. Particularly, the system includes an on-demand management system and data storage device comprising a plurality of selectable metal data and/or selectable housing data for ordering, customizing and the on-demand production of minted metal and/or housings thereof.

14 Claims, 9 Drawing Sheets

(56) References Cited

U.S. PATENT DOCUMENTS

| | | |
|---|---|---|
| 2002/0057289 A1 | 5/2002 | Crawford et al. |
| 2002/0152001 A1* | 10/2002 | Knipp .................. G07F 17/26 700/100 |
| 2002/0162756 A1 | 11/2002 | Seligman et al. |
| 2003/0035138 A1* | 2/2003 | Schilling .............. G06Q 10/087 358/1.15 |
| 2003/0069663 A1* | 4/2003 | Davis ..................... B44B 3/009 700/169 |
| 2003/0084596 A1* | 5/2003 | Zurawski ............... A44C 21/00 40/27.5 |
| 2004/0236634 A1* | 11/2004 | Ruuttu ................... G06Q 30/02 705/26.5 |
| 2005/0114157 A1 | 5/2005 | Moskowitz et al. |
| 2011/0235067 A1 | 9/2011 | Dodo et al. |
| 2012/0009036 A1 | 1/2012 | Marcos et al. |
| 2012/0291322 A1 | 11/2012 | O'Neill |
| 2013/0021630 A1 | 1/2013 | Hegemier et al. |
| 2013/0086484 A1 | 4/2013 | Antin et al. |

OTHER PUBLICATIONS

Patent Cooperation Treaty (PCT) International Search Report, for International Application No. PCT/US2014/038049, dated Sep. 30, 2014.

Patent Cooperation Treaty (PCT) Written Opinion of the International Searching Authority (ISA) for International Patent Application No. PCT/US2014/038049, dated Sep. 30, 2014.

* cited by examiner

SYSTEM AND METHOD FOR CUSTOMIZED, ON-DEMAND PRODUCTION OF MINTED METAL AND MINTED METAL ASSEMBLIES

FIELD OF THE INVENTION

The various embodiments of the present invention are generally directed to a system and method for the on-demand production of customized minted and/or imprinted metal pieces or materials. In certain embodiments, a custom minted metal assembly is provided or produced on-demand which includes the combination of a customized minted metal piece(s) with a customized housing, including, for example, but certainly not limited to, a credit card shaped and sized housing with custom, selected and/or predetermined decorative elements printed, embossed, or otherwise disposed thereon.

BACKGROUND OF THE INVENTION

Minting involves the process of imprinting precious metals, base metals, and other metals or metal alloys with lettering, images, etc. Traditionally, the metal minting industry has minted or otherwise marked large quantities of products in large lots as it has traditionally been the only cost effective way of producing minted metal due to the high costs of image designs, artwork, hand-design plaster sculpting and engraving, die work, die tooling, manufacturing, stamping, and pressing methods. In particular, the traditional manner of stamping metal is not only costly due to the inherent high expense of materials, but time consuming due to the manufacturing methods used.

The high costs and capital expenditure that is necessary in the traditional stamping methods limits the number of products that can be created, ties up valuable capital with no certainty of selling the products or inventory, prevents the launch of newer and better selling products, precludes the possible revision of the older products, and burdens the publisher, manufacturer or retailer with expensive inventory, storage and insurance costs. In short, the traditional methods put large amounts of capital at risk with no guarantee that the product will sell out to completion, leaving large quantities of unsold inventory and wasted capital.

There is, thus, a need for an on-demand metal minting system and method for minting metal when ordered, when needed, at low costs and only the quantity desired. The proposed system and method will provide a database of selectable data and/or media including size, shape, purities, and weight of certain metal pieces and, in some embodiments, allow the user to select or otherwise input desired text, images, or other decorative elements to be minted onto a selected metal piece. The system will utilize digital printing technology to mint the customized metal pieces with selected, designated, or custom decorative elements, on-demand, meaning as ordered in quantities as few as one, rather than minting excessively large quantities using the traditional, expensive and slow time to market methods. The new, proposed system and method need not preorder or manufacture expensive metal dies or stamps, and instead implements certain digital printing techniques by utilizing devices such as UV printers, UV curable inks, digital printers, digital photo printers, card printers, lasers, markers, engravers, 3-D printers, etchers, and pressure sensitive film printing, which offer high quality image production for imprinted products and allow on-demand production of minted metal pieces.

In certain embodiments, it would also be advantageous to implement the on-demand production of a housing to contain or otherwise combine with the minted metal piece. The housing can be printed, cut, sized, or otherwise customized in any manner on-demand and combined with the customized minted metal piece to produce a minted metal assembly. The housing may be in the form of virtually any encasing, container or wrapping, including, but certainly not limited to a credit card shaped and sized apparatus.

In particular, the proposed on-demand minting system and method allows the manufacturer, producer, or seller to maintain a virtual inventory or database of products, allowing for a larger number of available metals, designs, products, shapes, sizes, purities, etc. that would not be possible using traditional minting or stamping methods. The on-demand system and method allows for a "one-off" minting which permits products to be imprinted or minted on demand for personalization or for manufacturing scarce collectables.

The proposed system and method further provides a much quicker time to market, eliminating the time consuming steps of design, artwork, hand-designed plaster sculpting and engraving, die work, die tooling, manufacturing, stamping and pressing methods. It should also be noted that the proposed on-demand minting system and method would also eliminate costly storage expenses, as products are prepared and minted as needed or as ordered.

Furthermore, the system and method may be used to easily and cost-effectively incrementally fulfill limited minting of products to maximize the collectable value. Moreover, if a product is limited to a strict collectable mintage of only 500 pieces, for example, the proposed on-demand system and method will make it easy and possible to manufacture and sell them one at a time or in small quantities. Accordingly, rather than tying up an investment minting all 500 pieces at once, a publisher could easily launch multiple product offerings, on-demand.

SUMMARY OF THE INVENTION

The present invention is generally directed to a system and method for the on-demand production of minted metal pieces and minted metal assemblies, as described in detail herein. Particularly, the various embodiments of the present invention comprise an on-demand management system which includes a computer, server, or other device having one or more storage devices, such as a database or organized file system. The storage device or database includes a plurality of data or media pertaining to certain customized or selectable parameters for the minted metal piece or assembly.

For example, the storage device of certain embodiments comprises a plurality of selectable metal data which is structured to define the size, shape, purity, and/or weight of the minted metal piece. The data may also include certain text, quotes, images, pictures, artwork or other decorative elements or media that may be minted on the metal piece, on-demand. A user may either select from a list of predetermined decorative elements or specify, input or upload a custom decorative element, such as text or images. It should be noted that the user may access or select the various data via a client or user computer, which may include a desktop computer, laptop computer, tablet computer, cellular telephone, game console, music player, media device, downloadable application, web-based application, website, etc. The user of certain embodiments, as provided herein, may include an end-user, consumer, or purchaser of the minted metal piece or assembly; however, it should be noted that the user may also or instead be defined as a publisher, manufacturer, distributor, retailer, reseller, or other entity involved in the creation, production and sale of the minted metal piece or assembly. Accordingly, the user, regardless of his/her role, may access certain selectable data of the present invention to manage or customize the on-demand production of one or more minted metal pieces or assemblies.

Once the user has selected certain data or media and thereby placed an order for a minted metal piece or assembly, the on-demand management system will communicate instructions to an output or production system. The output or production system includes a plurality of stock metal bases and one or more minting machines, cutters, lasers, etc. The output or production system will thereby mint the metal piece, on-demand, or otherwise as ordered, according to the user-selected specifications and instructions provided by the on-demand management system.

Certain embodiments further include the on-demand production of a customized housing or packaging. In such a case, the user may also select or specify certain housing data, which may include the type of housing, material to be used, size, shape, etc. The user may also select or specify certain text or decorative elements to be printed on the housing, the location of the minted piece within the housing, etc. The housing data or media will then be communicated from the on-demand management system to the output or production system, which in such an embodiment, further includes a printer or other machinery to create or print the specified housing. The housing and the minted metal piece are then combined to form the minted metal assembly, on-demand.

These and other objects, features and advantages of the present invention will become more apparent when the drawings as well as the detailed description are taken into consideration.

BRIEF DESCRIPTION OF THE DRAWINGS

For a better understanding of the nature of the present invention, reference should be made to the following detailed description taken in connection with the accompanying drawings in which.

Like reference numerals refer to like parts throughout the several views of the drawings provided herein.

DETAILED DESCRIPTION OF THE INVENTION

Figure 1:
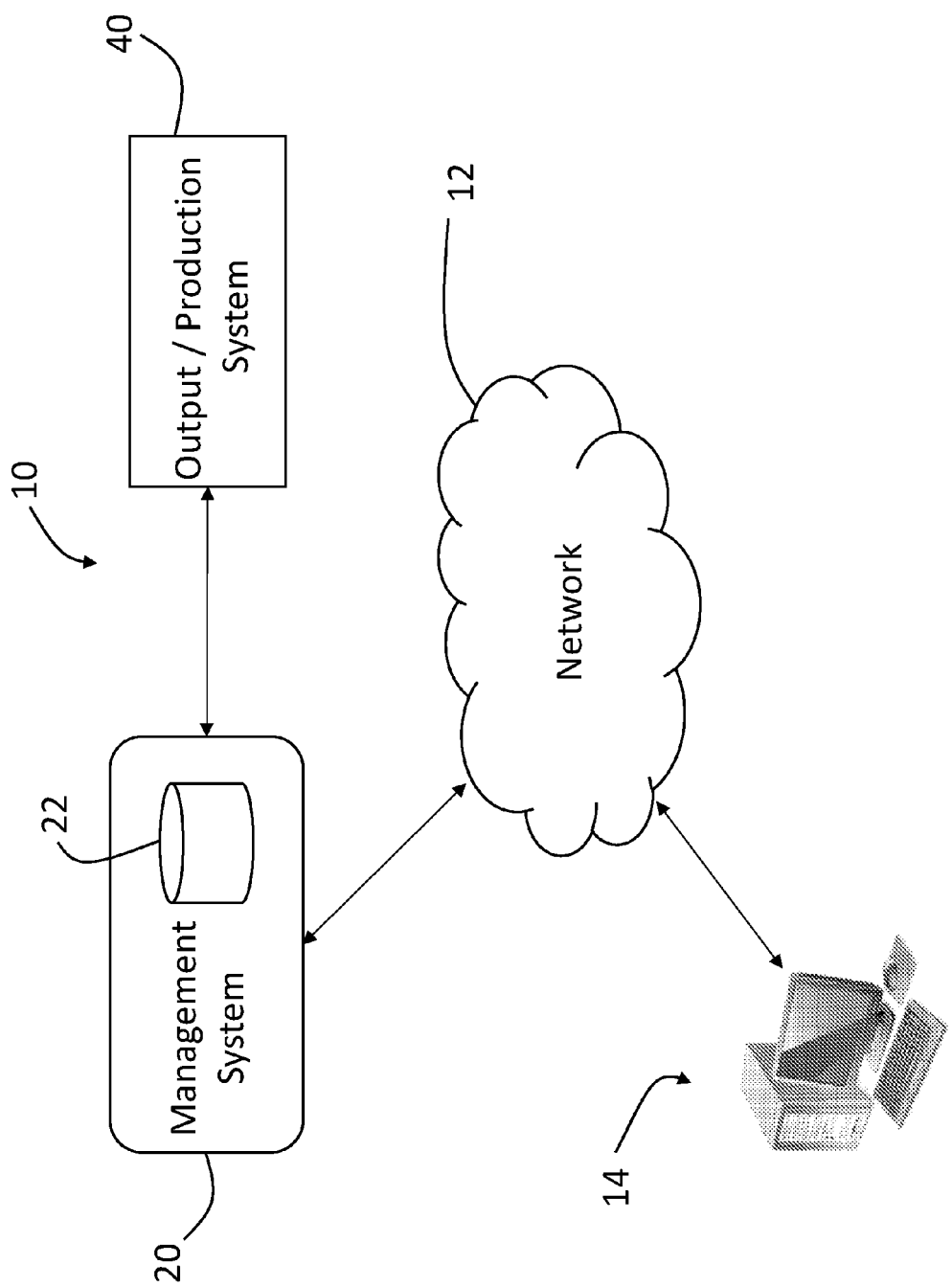
FIG. 1 is a schematic representation of the system for the customized and on-demand production of minted metal pieces and/or assemblies as disclosed in accordance with at least one embodiment provided herein.
Figure 2A:
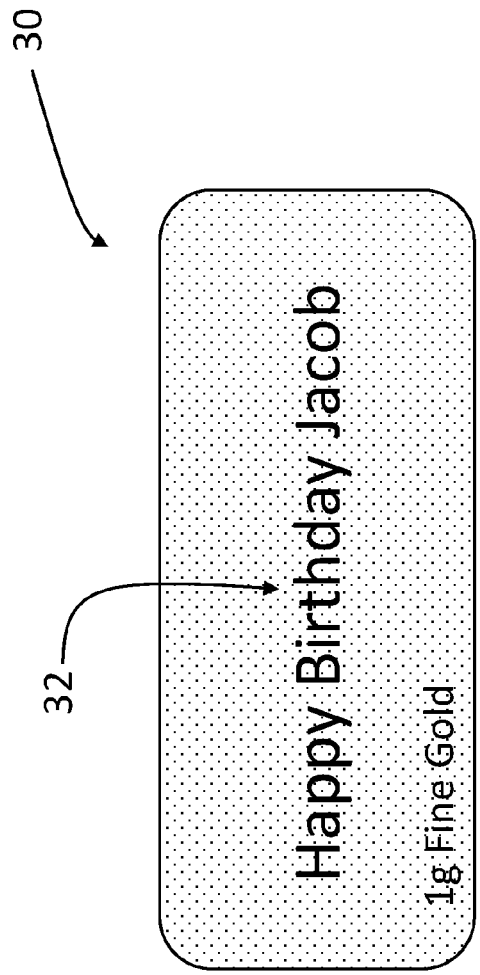
FIG. 2A is a front view of an exemplary minted metal piece produced on-demand by virtue of at least one embodiment of the present invention.
Figure 2B:
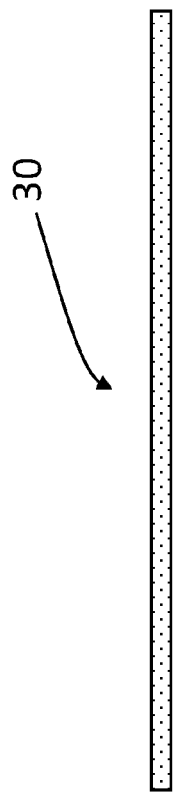
FIG. 2B is an elevation view of the embodiment illustrated in FIG. 2A.
Figure 3:
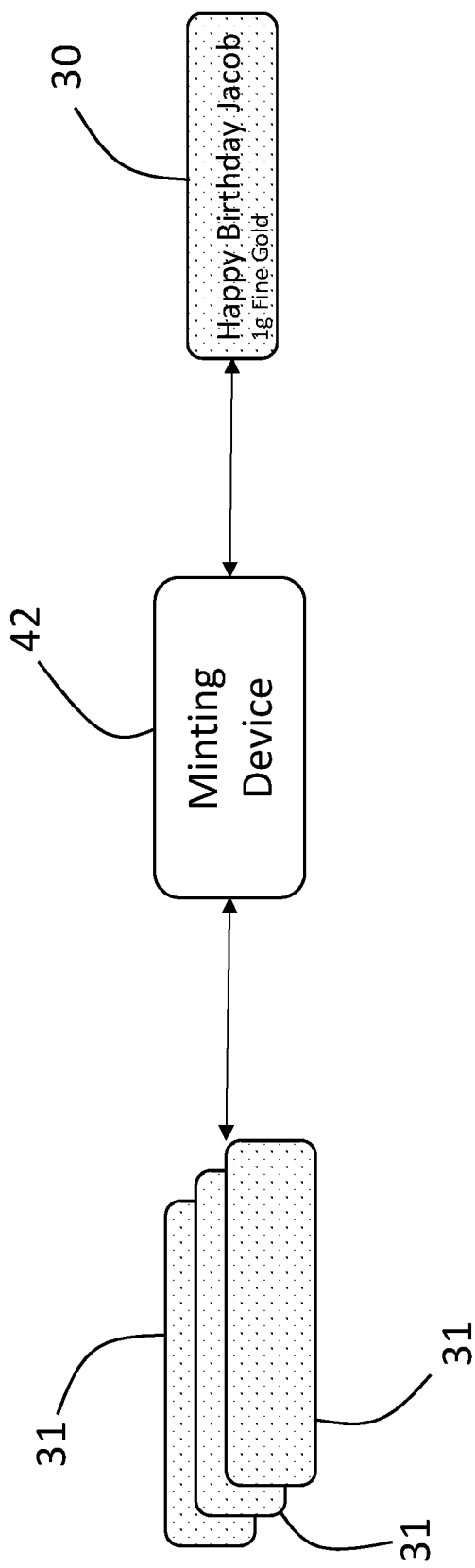
FIG. 3 is a schematic representation of the output and production system disclosed in accordance with at least one embodiment of the present invention.
Figure 8:
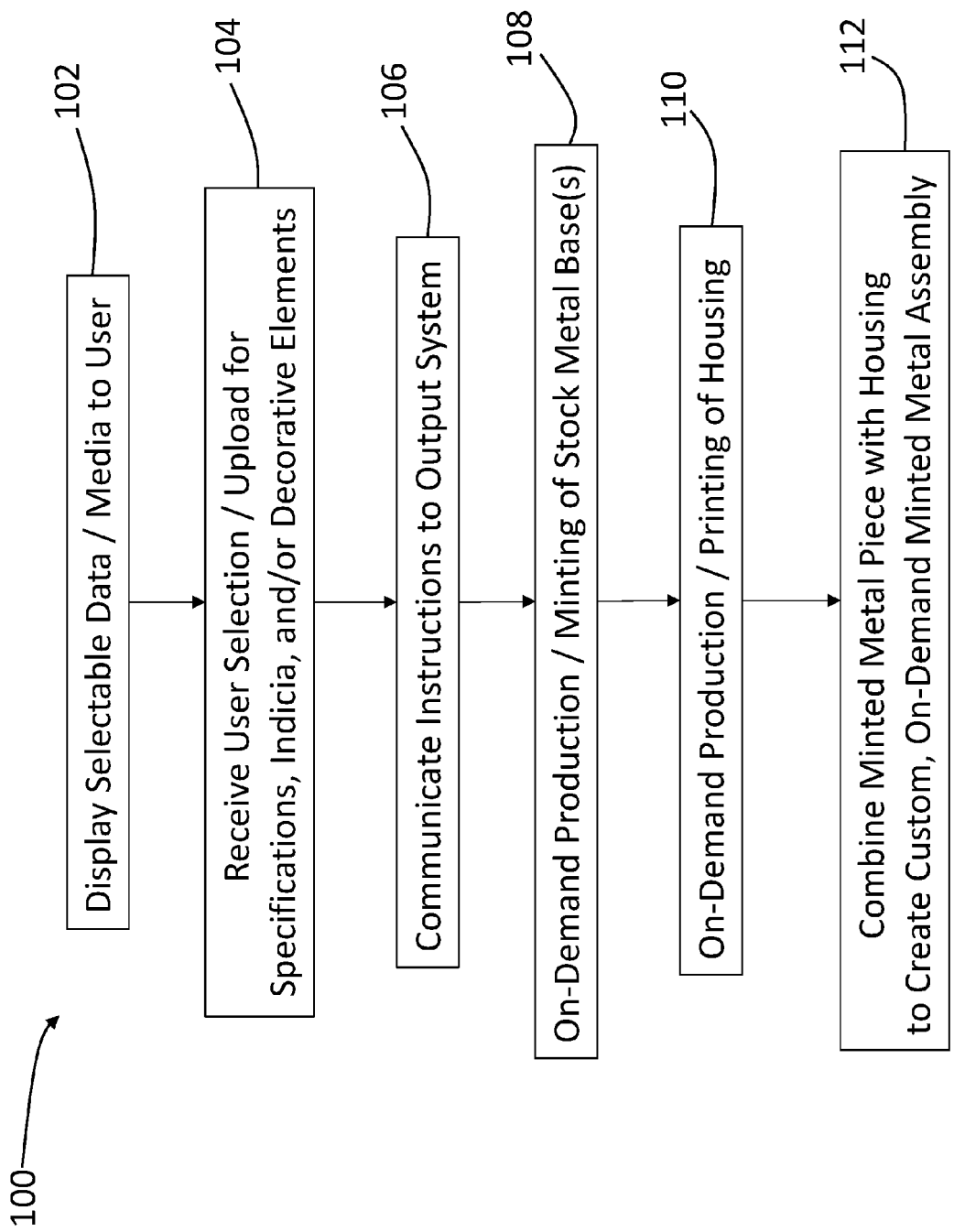
FIG. 8 is a high level flow chart of the method for the customized and on-demand production of minted metal pieces and/or assemblies disclosed in accordance with at least one embodiment of the present invention.

As shown in the accompanying drawings, and with particular reference to FIGS. 1 and 8, respectively, the present invention is generally directed to a system 10 and method 100 for the on-demand production and customization of minted metal, minted metal pieces and/or minted metal assemblies. As will be described herein, certain embodiments include a custom printed or designed housing, which when combined with the minted metal, form a minted metal assembly.

In particular, as used herein, the metal, metal piece(s), metal base(s) or metal material(s) include any metal or metal based material such as precious metals, base metals, or noble metals, including but in no way limited to gold, silver, platinum, copper, nickel, zinc, lead, iron, steel, aluminum, tin, tungsten, molybdenum, tantalum, cobalt, bismuth, cadmium, titanium, zirconium, antimony, manganese, beryllium, chromium, germanium, vanadium, gallium, hafnium, indium, niobium, rhenium, thallium, mercury, etc. or any combination or alloy thereof. As will be described herein, virtually all aspects of the customized minted metal piece 30 may be selected or customized by the user and minted on-demand, as desired, including, for example, the size, shape, weight, and certain decorative, imprinted or minted elements 32 disposed on one or more surfaces thereof.

As used herein, the term minting or minted shall include any minting, imprinting, printing, engraving, etching, marking, etc. of the metal piece 30 disclosed herein. The minting of various embodiments disclosed herein may be accomplished via any one or more minting devices, including, but certainly not limited to digital printers, card printers, lasers, laser printers, markers, engravers, UV printers, 3-D printers, photo printers, or pressure sensitive film printing.

As used herein, the term on-demand shall include the process or method of producing, printing, minting, or finalizing a product after an order has been placed or received, meaning that no inventory for the final or sold product is maintained or produced prior to the order being placed or specified.

Referring now to FIG. 1, the system 10 of at least one embodiment of the present invention includes an on-demand management system 20 comprising a computer processor (not shown) and a memory device (not shown). In particular, the on-demand management system 20 of the various embodiments of the present invention may include a computer, laptop computer, desktop computer, tablet computer, web server, computer server, etc., or virtually any computer-based system structured and configured to include and implement the various embodiments of the present invention. Accordingly, the on-demand management system 20 further comprises at least one data storage device 22 and/or database that includes or can otherwise access a plurality of selectable and customizable data and/or media, as will be described herein. For instance, the storage device 22 of the various embodiments may include any storage systems structured to implement the present invention in the intended manners, including, for example, internal storage, external storage, cloud-based storage, etc., via one or more hard drives, memory, databases, etc. Certain computer software components may also be implemented to access the various data described herein and to provide a user-friendly interface for a user to select, customize and/or order one or more minted metals or minted metal assemblies of the present invention.

In one embodiment, the on-demand management system 20 is disposed in a communicative relation with at least one computer network 12 and/or accessible by one or more client computer devices 14 via the computer network 12. For example, the computer network 12 may include any computer or data accessible network such as the Internet, World Wide Web, Intranet, WiFi, Telecommunication networks such as 3G, 4G, LTE, etc. The client computer 14 of certain embodiments may include virtually any computing device capable of connecting to the network 12 to access the data stored or otherwise managed by the on-demand management system 20. Accordingly, the client computer 14 may include a desktop computer, laptop computer, cellular telephone, mp3 player, music player, game console, personal digital assistant, etc. As such, a user at the client computer 14 my access or retrieve certain data (e.g., selectable metal data and/or selectable housing data) by virtue of visiting a web page, application, or other communication protocol. As will be described herein, the user may select or input desired specifications and selectable features in order to customize a minted metal piece or minted metal assembly, which will thereafter be produced on-demand in connection with the various embodiments of the present invention.

Furthermore, the on-demand management system 20 is disposed in a communicative relation with one or more output or production systems 40, which receive instructions from the on-demand management system 20 corresponding to one or more orders placed by a user, and produces the customized minted metal piece 30 or assembly 50, on-demand, or otherwise after the order is placed or received.

Particularly, in at least one embodiment, the output or production system 40 comprises a plurality of stock metal bases 31 comprising one or more shapes, sizes, denominations, weight and material. For instance, the plurality of stock metal bases 31 may include a number of gold, silver, platinum, etc. pieces of various weights, shapes, sizes, thicknesses, etc. These stock metal bases 31 are used as a generic metal piece and are therefore generally devoid of customized indicia or decorative elements, although certain generic indicia may be included such as certain identification indicia relative to the weight, type of metal, origination, company name or logo, etc.

Moreover, the output or production system 40 of the various embodiments of the present invention further includes a metal minting device, generally represented as reference character 42. Particularly, the minting device 42 is cooperatively structured to mint or otherwise mark the stock metal bases 31 with certain user-selected or customized indicia or decorative elements. Accordingly, as described briefly above, the minting device(s) 42 may include, but is certainly not limited to, a digital printer, card printer, laser, laser printer, marker, engraver, UV printer, 3-D printer, photo printer, or pressure sensitive film printer. The output or production system 40 of certain embodiments may further include metal cutting or sizing devices, rollers, or other machinery to customize the stock metal bases 31 on-demand, and in particular, immediately upon receipt of an order, rather than having to maintain a large, expensive inventory of already created pieces.

In this regard, a user may access the on-demand management system 20 of the various embodiments of the present invention, for example, via a computer 14, and selectively designate certain metal data specifications 60, such as metal type, size/weight, shape, and/or indicia or decorative elements via a graphical user interface. In particular, the on-demand management system 20 comprises a plurality of selectable metal data 60, stored or otherwise accessible via the data storage device 22, database or file system. Once selected, or once the user completes his or her order by selecting or designating certain selectable metal data 60, the on-demand management system 20 is structured to communicate corresponding instructions to the output system 40, as described above.

Figure 4:
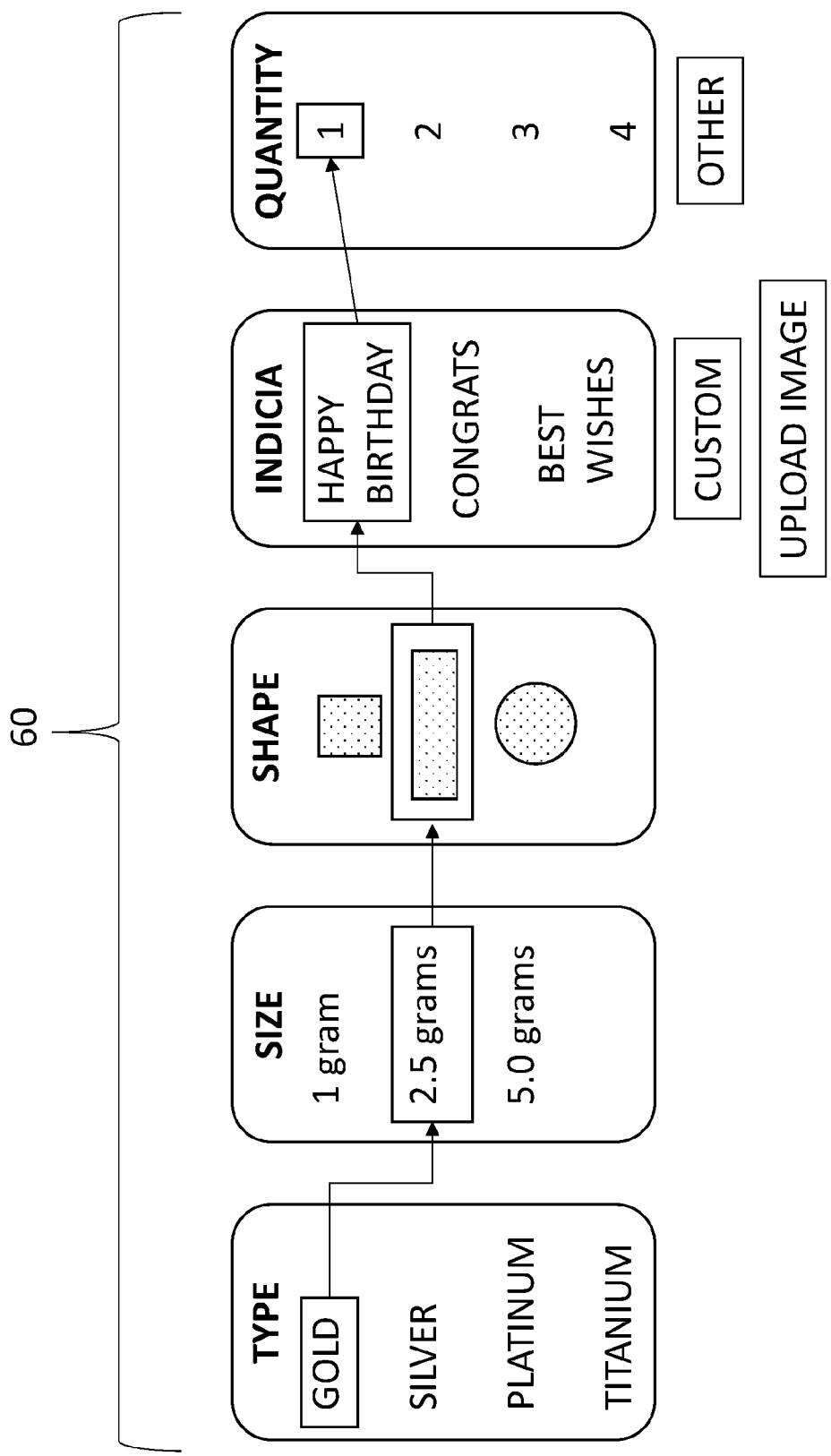
FIG. 4 is a schematic representation of certain selectable metal data and media in accordance with at least one embodiment disclosed herein.

Turning to the high level schematic of FIG. 4, the various selectable metal data 60 of at least one embodiment comprises the type of metal (e.g., gold, silver, titanium, platinum, etc.), the size, weight or purity of the metal (e.g., 1 gram, 2 grams, 3 grams, etc.), the shape of the metal (e.g., rectangle, square, triangle, etc.), certain indicia or decorative elements 32 to be minted on the metal piece 30, and/or quantity (e.g., 1, 2, 3, etc.). The indicia or decorative elements 32 may be selected from a predefined list of expressions, quotes, pictures, images, etc., or customized, designated or uploaded by the user by inputting text, photos, images, etc. to the on-demand management system 20. It should be noted that other elements, specifications, or data may be included within the spirit and scope of the selectable metal data 60 of the various embodiments of the present invention.

Once the metal data 60 is selected and specified, the on-demand management system 20 communicates the corresponding instructions to the output system 40. During the production of the minted metal piece 30, a stock metal base 31 is initially gathered, cut (if necessary), shaped (if necessary), rolled (if necessary), and minted (if necessary) to prepare the customized minted metal piece 30 selected by the user. In this manner, any quantity, as low as one, of minted metal pieces can be produced on-demand without the need for maintaining, ordering or manufacturing costly metal stamps or die, or maintaining large inventories of premade metal pieces.

In yet another embodiment, the system 10 of the present invention includes the on-demand production of a customized minted metal assembly 50. In particular, a minted metal assembly 50, as used herein, includes a customized minted metal piece 30 in combination with a custom housing 52. For instance, the housing 52 may include a credit-card shaped plastic card with a manufactured, etched or cut window, pocket, slot or hole 55 for the minted metal piece 30 to sit. Other housings 52 are contemplated including plastic blister pack type housings, which may include paper backings for displaying customized indicia thereon. In any event, the housing 52 may be generally rigid, non-rigid, and/or flexible, and made from virtually any material including plastic, paper, metal, or any combination thereof.

Figure 5A:
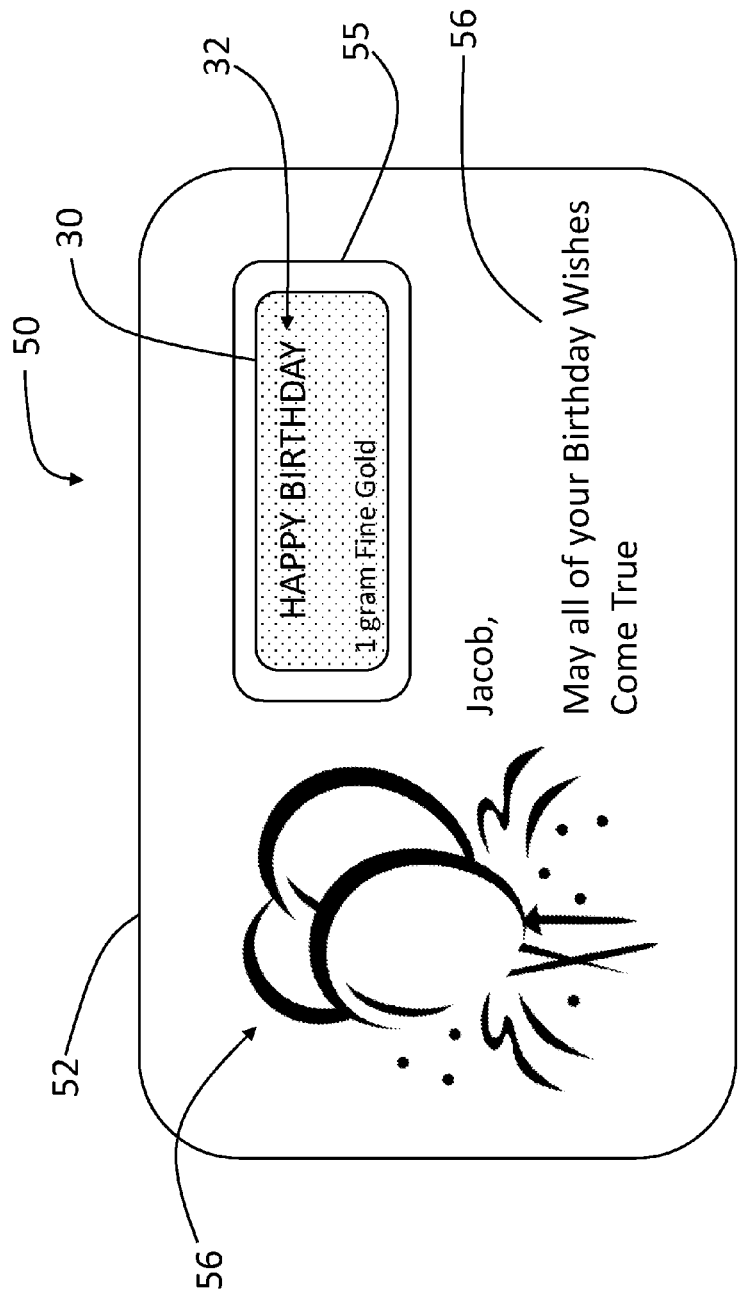
FIG. 5A is a front view of an exemplary minted metal assembly produced on-demand in accordance with at least one embodiment of the present invention.
Figure 5B:
FIG. 5B is an elevation view of the embodiment illustrated in FIG. 5A.
Figure 5C:
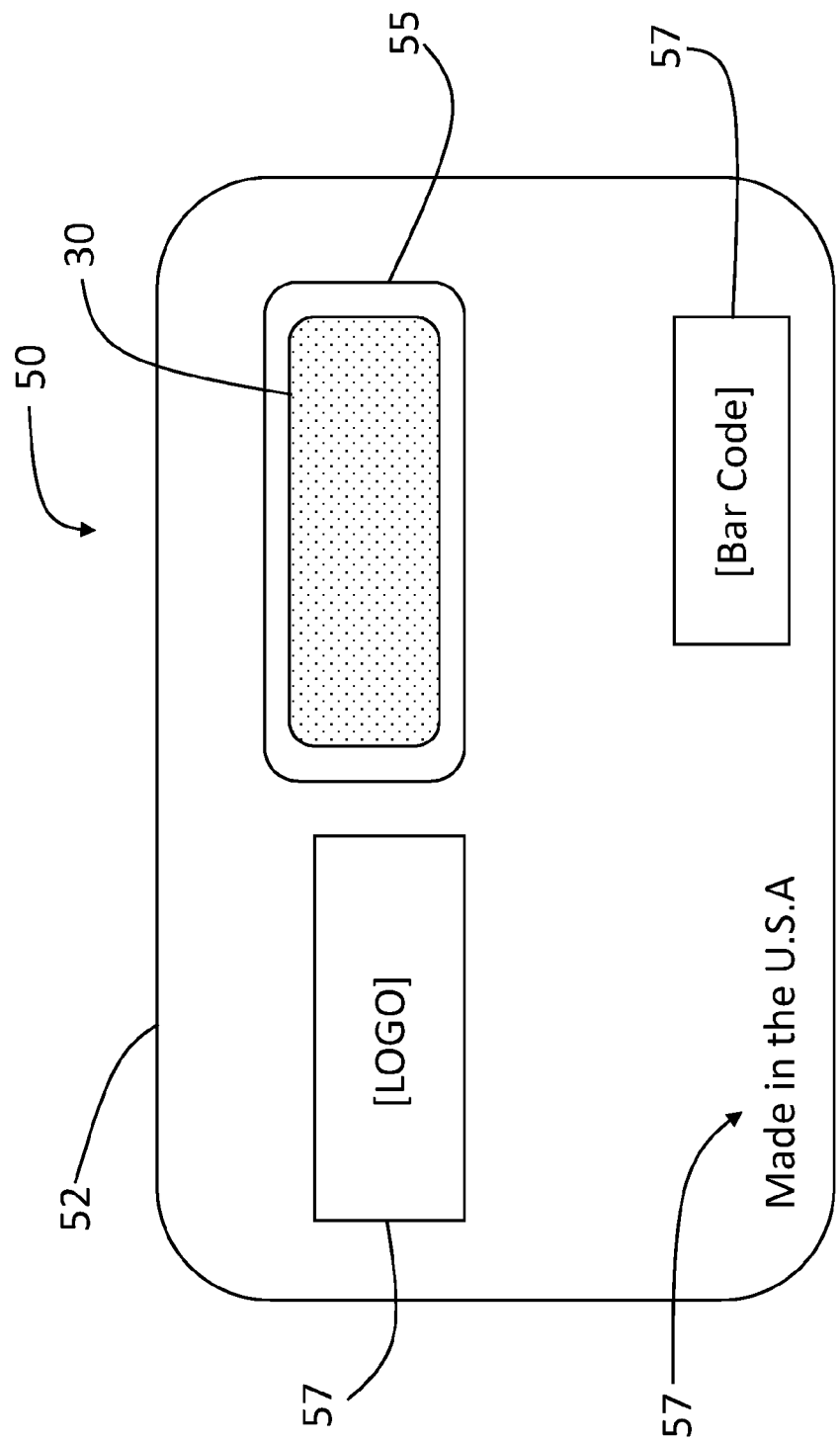
FIG. 5C is a rear view of the embodiment illustrated in FIGS. 5A and 5B.
Figure 6:
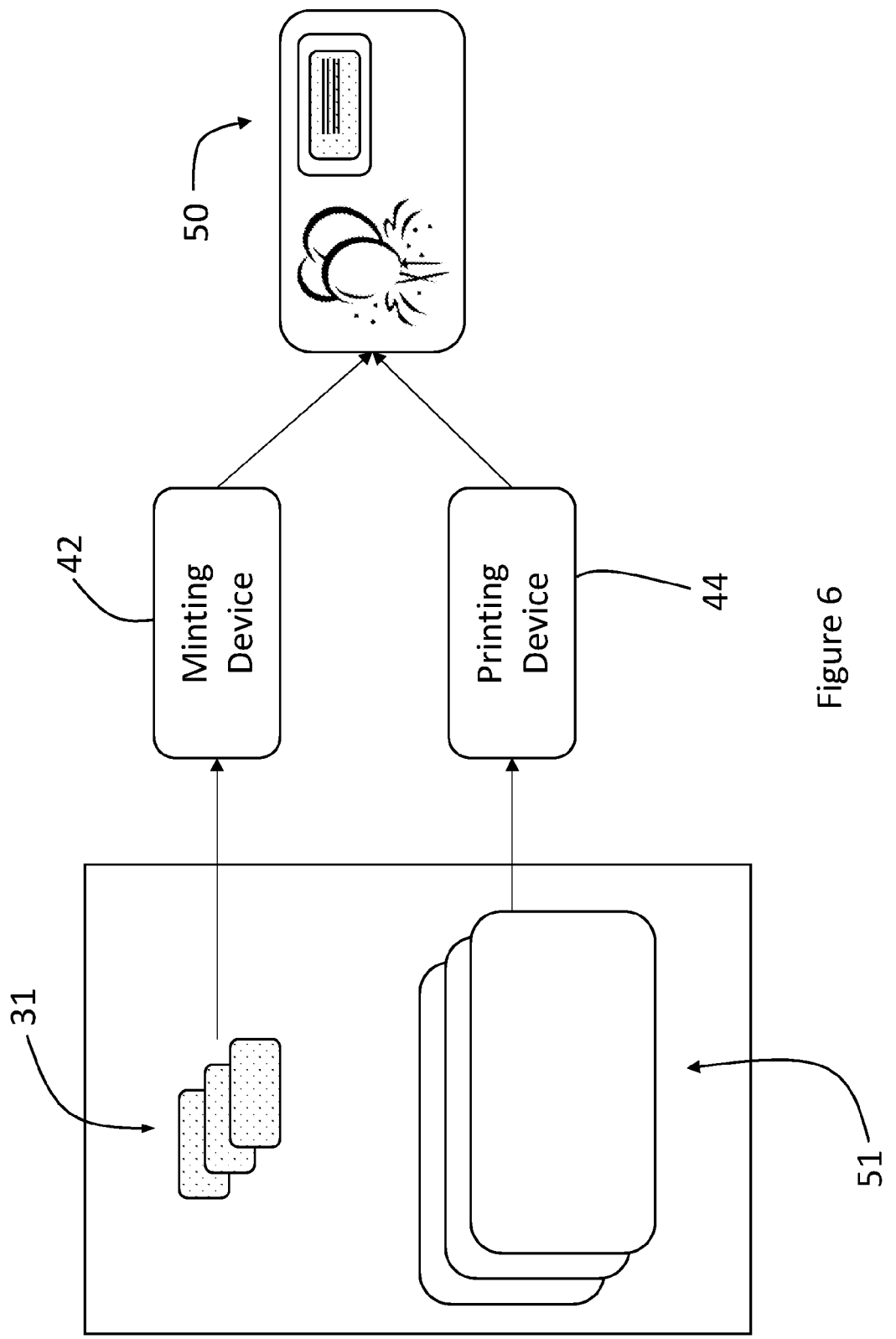
FIG. 6 is a schematic representation of the output and production system disclosed in accordance with yet another embodiment of the present invention.
Figure 7:
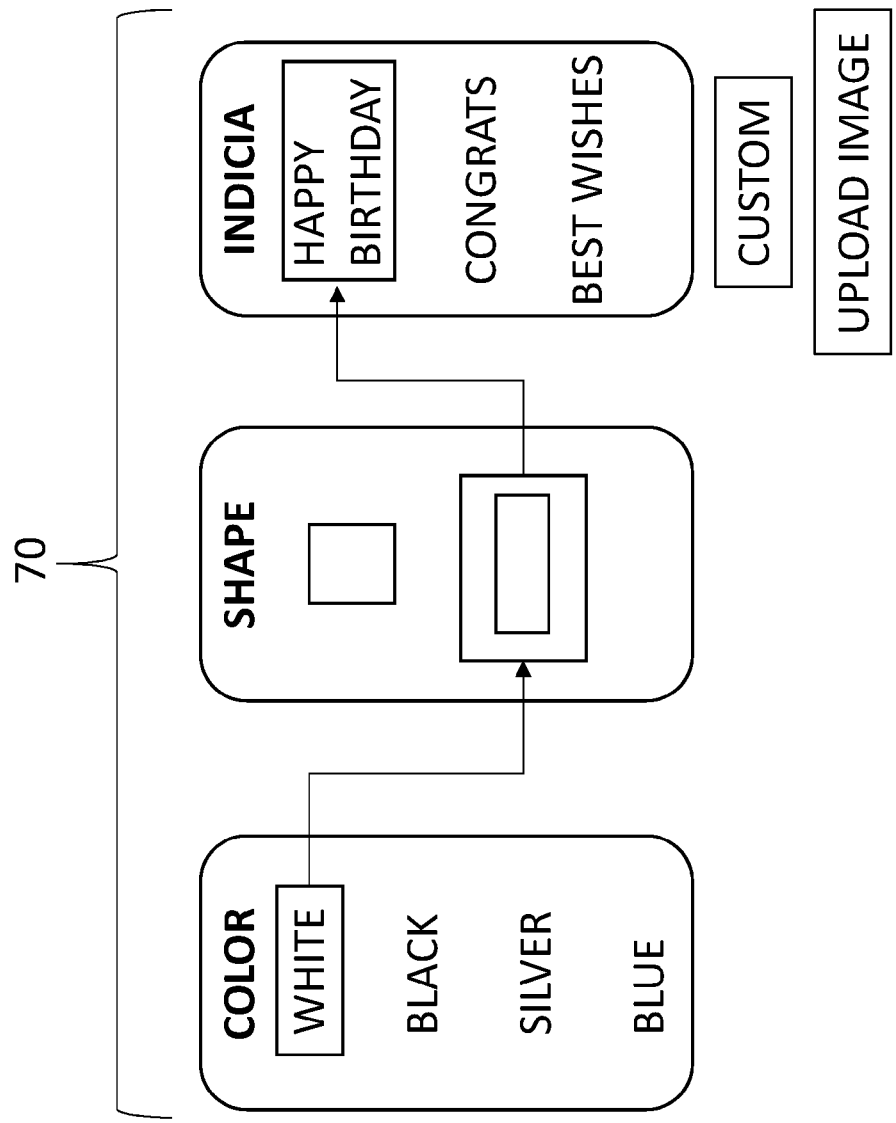
FIG. 7 is a schematic representation of certain selectable housing data and media in accordance with at least one embodiment disclosed herein

As shown in FIGS. 5A and 5C, respectively, the housing 52 of certain embodiments of the present invention includes at least a front and back surface both of which may include customized 56 and/or pre-designated 57 indicia printed thereon. Similar to customizing the on-demand minted metal piece 30, the user may also customize the housing 50 via selection or designation of certain housing data 70. For example, referring now to FIG. 7, in at least one embodiment, the user may select or designate the color of the housing, shape of the housing, and certain indicia to be printed on the housing. Of course, other housing data, including but not limited to the type of material, may be included within the spirit and scope of the present invention. It should also be noted that certain housing data 70 may be automatically selected or filtered depending on, for example, the type, size, and weight of the minted metal piece 30 that was or will be selected or ordered. Specifically, certain housing configurations may only correspond with certain metal pieces, and therefore the system 20 of the present invention may be configured to automatically select, designate or filter certain housing data. It should also be noted that if the user customizes the housing 52 first, or before selecting or customizing the minted metal piece 30, the system 20 may instead automatically select, designate or filter certain metal data to the user in order to correspond with the selected housing 52.

Particularly, the output or production system 40 of at least one embodiment comprises a plurality of stock housing pieces 51 which generally include blank cards, plastic blister packs, cardboard or paper inserts, etc. Specifically, the stock housing pieces 51 of at least one embodiment comprises a generic or stock piece of housing material, which may, but need not necessarily include certain predefined or predetermined indicia or decorative elements, including, for example, bar codes, item numbers, logos, etc. Once the user finishes customizing the housing via the graphical interface or on-demand management system 20 interface, instructions are communicated from the on-demand management system 20 to the output or production system 40 to complete, print, cut, or otherwise manufacture, on-demand, the housing 52. Specifically, the output system 40 may include one or more printers, generally designated at 44, lasers, cutting machines, lamination machines, heat sealing machines, etc. to prepare, manufacture and produce the housing 50, on-demand, or otherwise after the user orders or customizes it. In particular, once the order is placed, and the instructions are communicated to the output system 40, the output system 40 is structured to obtain, either automatically or via manually assistance, one or more stock housing pieces 51. The stock housing piece(s) 51 is then processed through the printers, lasers, cutting machines, or other production devices to prepare the customized housing 52.

Furthermore, once the minted metal piece 30 and the housing 52 are produced or otherwise minted and printed, each are combined with one another to create the final minted metal assembly 50. In particular, some embodiments require the minted metal piece 30 to be disposed within a window or pocket 55 of the housing 52. Other processing and finishing techniques may be employed, such as lamination, heat sealing, etc. to finalize the production of the on-demand minted metal assembly 50. Thus, in certain embodiments, the output system 40 further includes any necessary machinery or assemblies to accomplish such process.

Referring now to the high level flow chart of FIG. 8, at least one embodiment of the present invention further comprises a method for customized, on-demand production of a minted metal assembly, generally referenced as 100. In particular, the minted metal assembly 50 of the method 100 includes a customized minted metal piece 30 and a customized housing 52, as described in greater detailed herein. It should also be noted that a method for the customized, on-demand production of a minted metal piece 30, alone, and not in combination with a housing 52 is also contemplated and disclosed herein.

Further, the method 100 of the present invention comprises displaying, to a user via a computer network, a plurality of selectable metal data and/or a plurality of selectable housing data, as generally referenced as 102 in FIG. 8. Particularly, the selectable metal data 60, as described herein, corresponds to the on-demand production of a minted metal piece, and may thus include, but is not limited to, the type of metal, the size, weight or purity of the metal, the shape of the metal piece, the indicia or decorative elements to be minted on the metal piece, and the quantity. Specifically, the quantity may be any number from one or above in that the method of the present invention is structured to print, mint and/or otherwise produce the minted metal piece 30 or assembly 50 on-demand, or otherwise after the order is placed by the user or immediately following the order placement. Similarly, the housing data 70 is structured to correspond to the on-demand production of the housing 52, as described herein, and may include, but is certainly not limited to, the color or color scheme, the shape of the housing, the size of the housing, the material of the housing, the indicia or decorative components or elements to be printed on the housing, and the quantity.

The selectable metal and/or housing data may be displayed to the user on a computer screen or any user-accessed electronic device 14 structured to access the on-demand management system 20, for example, via a graphical user interface, downloadable application, web-based application, website, etc. The method 100 of at least one embodiment of the present invention further includes receiving a user selection, generally referenced at 104. In particular, once the user selects or inputs certain data, information or customized parameters relating to a minted metal piece and/or assembly, the user selection or designation is communicated to or received by the on-demand management system 20 of the present invention.

As generally referenced at 106, instructions are then provided or communicated to an output system or assembly, which includes a plurality of stock metal bases, a plurality of stock housing pieces, a metal minting device or machine, a housing printing device or machine, and/or any other machinery needed to complete the production of the minted metal piece 30 or assembly 50, including, but certainly not limited to, digital printers, card printers, lasers, laser printers, markers, engravers, UV printers, 3-D printers, photo printers, or pressure sensitive film printing.

The method 100 further comprises on-demand minting of at least one of the plurality of stock metal bases based upon the plurality of selectable metal data associated with the user selection to create the customized minted metal piece, as generally illustrated at 108. Specifically, the metal piece 30 is minted on only the quantity ordered or desired, for example, as designated via the user input or order. In this manner, the metal pieces are only minted and/or imprinted when needed, as needed, and at low cost via digital printing technology and without the need to maintain costly inventory, storage, dies, stamps, etc. It should also be noted that the stock metal base may be cut, shaped, rolled, etched, imprinted, etc. as needed or as desired.

Moreover, as represented at reference character 110, the method 100 of at least one embodiment further includes on-demand printing of at least one of the plurality of stock housing pieces based upon the plurality of selectable housing data associated with the user selection to create the customized housing. It should be noted that the stock housing piece may also be cut, dyed, shaped, etc., as needed and as desired, on-demand.

Once the minted metal piece 30 and the housing 52 are minted, printed, or otherwise customized as desired on-demand, the items are combined with one another to create the minted metal assembly, as generally illustrated at reference character 112 in FIG. 8. In particular, the minted metal piece 30 may be placed or positioned within a window, pocket or other designated area within the housing 52. Other processes, including, but certainly not limited to lamination, heat sealing, clasping, etc. may be needed to finalize the combining of the minted metal piece 30 and the housing 52.

This written description provides an illustrative explanation and/or account of the present invention. It may be possible to deliver equivalent benefits and insights using variations of the sequence, steps, specific embodiments and methods, without departing from the inventive concept. This description and these drawings, therefore, are to be regarded as illustrative and not restrictive.

Now that the invention has been described,

What is claimed is:

1. A computer-based system for customized, on-demand production of minted metal, comprising:
    an on-demand management system comprising a computer processor, memory and at least one on-demand data storage device, said at least one on-demand data storage device comprising a plurality of selectable metal data corresponding to said customized, on-demand production of minted metal,
    said on-demand management system being disposed in a communicative relation with at least one output system, said at least one output system comprising a metal minting device,
    said output system further comprising a plurality of stock metal bases,
    said on-demand management system being structured to receive a user selection corresponding to said plurality of selectable metal data, and thereupon, communicate corresponding instructions to said at least one output system to produce, on-demand, a customized minted metal piece,
    wherein upon receipt of said corresponding instructions from said on-demand management system, said output system is structured to select a corresponding one of said plurality of stock metal bases and produce said customized minted metal piece therefrom, and
    said on-demand data storage device further comprising a plurality of selectable housing data corresponding to a customized, on-demand production of a housing for said customized minted metal piece.

2. The system as recited in claim 1 wherein said on-demand management system is further disposed in a communicative relation with a computer network and structured to facilitate remote user selection and customization of said customized minted metal piece via said computer network.

3. The system as recited in claim 1 wherein said plurality of selectable metal data comprises a metal type and a decorative element.

4. The system as recited in claim 3 wherein said output system is structured to mint a user selected decorative element on at least one of said plurality of stock metal bases.

5. The system as recited in claim 3 wherein said output system is structured to mint a user selected decorative element on a single one of said plurality of stock metal bases.

6. The system as recited in claim 3 wherein said plurality of selectable metal data further comprises a metal size and a metal shape.

7. The system as recited in claim 1 wherein said output system further comprises a plurality of stock housing pieces.

8. The system as recited in claim 7 wherein said on-demand management system is structured to communicate corresponding instructions to said at least one output system to produce, on-demand, a customized housing for said customized minted metal piece, and wherein, upon receipt of said corresponding instructions from said on-demand management system, said output system is structured to select at least one of said plurality of stock housing pieces and produce said customized housing therefrom.

9. The system as recited in claim 8 wherein said output system is further structured to combine said customized minted metal piece with said customized housing.

10. A computer-based system for customized, on-demand production of a minted metal assembly, said minted metal assembly comprising a customized minted metal piece and a customized housing, said system comprising:
    an on-demand management system comprising a computer processor, memory and at least one on-demand data storage device, said at least one on-demand data storage device comprising a plurality of selectable metal data and a plurality of selectable housing data, said plurality of selectable metal data corresponding to an on-demand production of said customized minted metal piece, and said plurality of selectable housing data corresponding to an on-demand production of said customized housing,
    said on-demand management system being disposed in a communicative relation with at least one output system, said at least one output system comprising a metal minting device and a housing printing device,
    said output system comprising a plurality of stock metal bases and a plurality of stock housing pieces,
    said on-demand management system being structured to receive a user selection corresponding to said plurality of selectable metal data and said plurality of selectable housing data,
    upon receipt of said user selection, said on-demand management system is structured to communicate corresponding instructions to said at least one output system to produce, on-demand, said minted metal assembly, and
    wherein upon receipt of said corresponding instructions from said on-demand management system, said metal minting device of said output system is structured to mint a corresponding one of said plurality of stock metal bases and said housing printing devices is structured to print a corresponding one of said stock housing pieces to produce said minted metal assembly.

11. The system as recited in claim 10 wherein said on-demand management system is further disposed in a communicative relation with a computer network and structured to facilitate remote user selection and customization of said minted metal assembly via said computer network.

12. A method for customized, on-demand production of a minted metal assembly, the minted metal assembly comprising a customized minted metal piece and a customized housing, the method comprising:
    displaying to a user via a computer network a plurality of selectable metal data and a plurality of selectable housing data, said plurality of selectable metal data corresponding to on-demand production of the customized minted metal piece, and the plurality of selectable housing data corresponding to on-demand production of the customized housing,
    receiving a user selection at an on-demand management system, the on-demand management system comprising a computer processor, a memory, and at least one data storage device, the at least one data storage device comprising the plurality of selectable metal data and the plurality of selectable housing data, the user selection comprising customized parameters corresponding to the plurality of selectable metal data and the plurality of selectable housing data, communicating the user selection from the on-demand management system to an output system, the output system comprising a plurality of stock metal bases, a plurality of stock housing pieces, a metal minting device and a housing printing device, on-demand minting of at least one of the plurality of stock metal bases based upon the plurality of selectable metal data associated with the user selection to create the customized minted metal piece, on-demand printing of at least one of the plurality of stock housing pieces based upon the plurality of selectable housing data associated with the user selection to create the customized housing, and combining the customized minted metal piece with the customized housing to create the minted metal assembly.

13. The method as recited in claim 12 further comprising disposing the on-demand management system in a communicative relation with at least one computer network.

14. The method as recited in claim 13 further comprising receiving a user selection from a remote computer system.

* * * * *